(12) United States Patent
Horovitz et al.

(10) Patent No.: US 6,389,409 B1
(45) Date of Patent: May 14, 2002

(54) METHOD FOR OBTAINING UNIFIED INFORMATION GRAPH FROM MULTIPLE INFORMATION RESOURCES

(75) Inventors: Oren Horovitz, Tel-Aviv; Yael Karov, Raanana, both of (IL)

(73) Assignee: Agentics Ltd. (IL)

( * ) Notice: Subject to any disclaimer, the term of this patent is extended or adjusted under 35 U.S.C. 154(b) by 0 days.

(21) Appl. No.: 09/105,161

(22) Filed: Jun. 26, 1998

(30) Foreign Application Priority Data

Jun. 27, 1997 (IL) .............................................. 121181

(51) Int. Cl.[7] .............................................. G06F 17/30
(52) U.S. Cl. .................. 707/2; 707/3; 707/4; 707/104; 707/513; 342/335; 342/340; 342/352; 709/203
(58) Field of Search ........................... 707/2, 3, 4, 104, 707/513; 345/335, 340, 352; 709/203

(56) References Cited

U.S. PATENT DOCUMENTS

| | | | | |
|---|---|---|---|---|
| 5,295,244 A | * | 3/1994 | Dev et al. ..................... | 395/161 |
| 5,530,852 A | * | 6/1996 | Meske, Jr. et al. .......... | 395/600 |
| 5,793,966 A | * | 8/1998 | Amstein et al. ....... | 395/200.33 |
| 5,890,175 A | * | 3/1999 | Wong et al. ................. | 707/505 |
| 5,963,208 A | * | 10/1999 | Dolan et al. ................. | 345/357 |
| 6,029,175 A | * | 2/2000 | Chow et al. ................. | 707/104 |
| 6,029,182 A | * | 2/2000 | Nehab et al. ............... | 707/523 |
| 6,035,330 A | * | 3/2000 | Astiz et al. .................. | 709/218 |
| 6,119,105 A | * | 9/2000 | Williams ...................... | 705/39 |

OTHER PUBLICATIONS

*The InfoSleuth Project*: Intelligent Search Management via Semantic Agents (Internet Article), by Darrell Woelk and Christine Tomlinson, Microelectronics and Computer Technology Corporation, undated., No date.
*KSL Ontology Server Projects* (Internet Article), undated., No date.

* cited by examiner

*Primary Examiner*—Jack Choules
*Assistant Examiner*—Cheryl Lewis
(74) *Attorney, Agent, or Firm*—Dov Rosenfeld; Inventek (57) ABSTRACT

A method for dynamically obtaining a unified classification information graph which provides a navigation system for a user to access sought information. The method includes providing a multiple information resources that include hierarchy of categories that are associated, each, with a category. Leaf categories in the hierarchy are connected to information pages. The method filter provides generating a unified classification information graph by using the hierarchy of categories and the categories of the multiple information resources. The unified classification graph includes hierarchy of unified categories. Leaf unified categories in the hierarchy are connected to inflation pages, whereby, information pages accessible through the hierarchy of the multiple information resources are also accessible through the hierarchy of the unified classification information graph.

22 Claims, 5 Drawing Sheets

```
INFORMATION RESOURCE: GRAPH 1
Root
    Color monitor [connection1: URL: 1.1]
        under 14 inch [connection1: URL: 1.1.1]
        14 inch [connection1: URL: 1.1.2]
        15 inch [connection1: URL: 1.1.3]
        16 inch to 19 inch [connection1: URL: 1.1.4]
        20 inch and over [connection1: URL: 1.1.5]
    monochrome monitor [connection1: URL: 1.2]
        14 inch [connection1: URL: 1.2.1]
        under 14 inch [connection1: URL: 1.2.3]
        16 inch to 19 inch [connection1: URL: 1.2.4]
        20 inch and over [connection1: URL:  1.2.5]
```

```
INFORMATION RESOURCE: GRAPH 2
Root
    Monitor [connection1: URL:2.1]
        14 color monitor [connection1:URL:2.1.1]
        15 color monitor [connection1: URL:2.1.2]
        17 color monitor [connection1: URL:2.1.3]
        macintosh specific color monitor [connection1: URL:2.1.4]
        20 and larger color monitor [connection1: URL: 2.1.5]
        cables [connection1: URL: 2.1.6]
```

```
INFORMATION RESOURCE: GRAPH 3
Root
    monitor color [connection1: URL: 3.1]
        22 [connection1: URL: 3.1.1]
        12 to 14 [connection1: URL: 3.1.2]
            .28 dot pitch [connection1: URL: 3.1.2.1]
            .25 dot pitch [connection1: URL: 3.1.2.2]
        15 [connection1: URL:   3.1.3]
            .31 dot pitch [connection1: URL: 3.1.3.1]
            .28 dot pitch [connection1: URL: 3.1.3.2]
            .25 dot pitch [connection1:URL: 3.1.3.3]
        19 to 21 full page [connection1: URL: 3.1.4]
            .31 dot pitch [connection1: URL: 3.1.4.1]
            .39 dot pitch [connection1: URL:  3.1.4.2]
            .25 dot pitch [connection1: URL:  3.1.4.3]
            .28 dot pitch [connection1: URL:  3.1.4.4]
        16 to 17 [connection1: URL:3.1.5]
            .31 dot pitch [connection1: URL: 3.1.5.1]
            .39 dot pitch [connection1: URL:3.1.5.2]
            .25 dot pitch [connection1: URL:3.1.5.3]
            .28 dot pitch [connection1: URL:3.1.5.4]
        cables & connectors [connection1: URL: 3.1.6]
```

FIG. 4A

```
Root

Monitor [connection 1: URL:2.1]
    Color monitor [connection1: URL:1.1,
                   connection2: URL: 3.1]
        .28 dot pitch  [connection1: URL:  3.1.2.1]
        .25 dot pitch  [connection1:  URL:  3.1.2.2]
        Unknown [connection1 URL: 1.1.1,
                 connection 2: URL:3.1.2, pf: =>12<14, nf=14]
     14 inch [connection1: URL: 1.1.2,
              connection2: URL: 2.1.1,
              connection3: URL:  3.1.2, pf:14, 12,=<nf<14]
     15 inch [connection1:URL= 3.1.3]
         .31 dot pitch [URL = 3.1.3.1]
         .28 dot pitch [URL = 3.1.3.2]
         .25 dot pitch [URL = 3.1.3.3]
         Unknown [connection1: URL: 1.1.3,
                  connection2: URL:2.1.2]
     16 inch to 19 inch [pf=>16,<19 URL= 1.1.4]
                  ...

20 inch and over  [connection1: URL:pf =>20 URL= 4.0
                        nf<20 URL = 1.1.5]
                  ...

macintosh specific color monitor[connection1: URL: 2.1.4]
    cables & connectors [connection1: URL:2.1.6,
                         connection2: URL: 3.1.6]

monochrome monitor [connection1: URL:2.1.4]
        14 inch [connection1: URL: 1.2.1]
        under 14 inch [connection1: URL: 1.2.3]
        16 inch to 19 inch [connection1: URL: 1.2.4]
        20 inch and over [connection1: URL: 1.2.5]

cables
        color monitor cables [connection1: URL: 3.1.6  pf:
                              cables, nf: connectors]
        Unknown [connection1: URL 2.1.6]
``` pf= positive filter
nf= negative filter

FIG. 4B

METHOD FOR OBTAINING UNIFIED INFORMATION GRAPH FROM MULTIPLE INFORMATION RESOURCES

FIELD OF THE INVENTION

This invention relates to daft retrieval and learning systems.

BACKGROUND OF THE INVENTION

In the context of distributed information systems (e.g the Internet), there is a need to provide end users with a centralized access and search services to information residing in multiple heterogeneous on-line catalogs. These on-line catalogs should be viewed by the users as if they were using the very same access method, information classification and nomenclature. This concept is called 'information integration' and is the subject of several research and development effort. Among them are:

Stanford University, Knowledge Systems Laboratory (KSL) Ontology Server Projects Microelectronics and Computer Technology Corporation (MCC)—Infoslouth There are three main problems associated with information integration:

1) Different conceptualization systems—providing access to relevant information which is accessible through different classification methods and described using non identical nomenclatures. This means bridging the gap between the different conceptualization systems—the one used by the user to describe his query and those used by each of different information resources. These conceptualization differences range from classification method to nomenclature (e.g. the user is looking for "RS232 Cable for Printer" which is listed in one on-line catalog under the name "RS232 cable" in the sub section "Accessories" in the super section "Painters" and in another on-line-catalog under the name "Printer cable" in the section "Hardware accessories"). This is a very tough task, since it involves the formalization of "knowledge".

2) Resource selection—deciding which of the available information resources is relevant for a specific information request (e.g. there is no point in accessing resources providing information about restaurants when the user looks for automobile). Indeed, in the domain level, it is an easy task However, in larger arrays of information resources from similar domains, the problem becomes harder.

All the research projects listed above deal with different aspects of these problems making different assumptions on the environment. However, to-date, there are no general purpose information integration systems at all. There are two main reasons for this:

1. There are no automatic mechanisms to "connect" to new information resources. Current solutions to the task of connecting to information resources are based on the assumption that "someone" (either the information requester or the information provider) provides information source "wrapper" that enables "smooth" integration to the data.

2. There is no way to automatically a create large scale conceptualization system. The current solution to the problem of creating a common unified conceptualization system is a manual solution provided by the Knowledge System Laboratory (KSL) at Stanford University. The KSL staff has developed a set of tools and services to support the process of manually building and achieving consensus on a common shared conceptualization system (termed "Ontology".

It is only natural, then, that the lack of a real world conceptualization system adversely affects both the quality of the information being retrieved (recall and precision) and the quality of the user-computer interaction. That is, real world information integration requires the automatic acquisition of conceptual knowledge base (conceptulization system).

In recent years, the task of automatic knowledge acquisition was usually approached by corpus-based NLP. Free text documents were used as a source for learning different relations between words (e.g., contextual similarity).

SUMMARY OF THE INVENTION

The emergence of a global standard computer network, and more specifically, the Internet, has led to the proliferation of classified on-line catalogs. This enables to use the information navigation systems. One of the innovations of the present invention is the usage of the knowledge embedded in these very navigation systems as a new source for the knowledge acquisition task in order to generate a so called unified classification information graph. Information navigation systems, by their nature, imply hierarchy relations between categories, hence enable to learn more precise category-relations information then free text does. The categories and the hierarchy relations between categories is utilized in the process of generating the unified classification information graph.

The present invention offers how to overcome the difficulties in the usage of the multiple resources (e.g. the same piece of information may be expressed in word order or levels of abstraction) so as to generated the desired unified classification information graph.

Since on-line catalogs are by nature subject to frequent (and occasionally also major) changes (e.g. new products/categories are added and/or others are deleted) it is important to sure that all or at least most of the modifications that occurred in the online catalogs will be reflected in the resulting unified classification information graph. Accordingly, one of the important advantages of the system is the dynamic nature thereof, i.e. the ability to dynamically scan the multiple information resources and update, whenever required, the resulting unified information graph.

The invention fulfills thus a long felt need by providing a system and method for obtaining and integrating multiple classification information resources using a single unified access interface.

By one aspect, the invention provides for a method for dynamically obtaining a unified classification information graph which provides a navigation system for a user to access sought information, comprising:

providing a multiple information resources that include a respective hierarchy of categories each of which associated with a category; leaf categories in said hierarchy being connected to information pages;

generating a unified classification information graph utilizing at least the hierarchy of categories and the categories of said multiple information resources; said unified classification graph includes hierarchy of unified categories; leaf unified categories in said hierarchy being connected to information pages;

whereby, information pages accessible through the hierarchy of said multiple information resources are also accessible through the hierarchy of said unified classification information graph.

By one embodiment, said step (a) includes providing at least some of said multiple information resources that are located in sites of the Internet.

By another embodiment, said step (a) includes providing at least some of said multiple information resources that are located in databases.

By still another embodiment said step (a) includes providing at least some of said multiple information resources that are located in on-line catalog.

Still further there is provided the step of associating categories in said hierarchy of categories in said multiple information resources with hyper-links.

Yet still further there is provided the step of associating categories in said hierarchy of categories in said multiple information resources with menus.

By one embodiment said step (b) includes:
(i) initalization so as to generate respective link graph that correspond to each information resource; said link graph includes link graph categories;
(ii) normalizing the link graph categories so as to generate classification graph that includes classification graph categories; and
(iii) unifying said classification graph so as to generate said unified classification information graph.

By this embodiment there is further provided the step of providing a URL pointer of said on-line catalog for generating said ink graph.

By another aspect the invention provides for a machine having a memory which contains data representing a unified classification information graph which was generated by the above method.

Still further, there is provided a memory for storing data for access by an application program, which approgram is accessed by a user through a user interface for the user to access sought information; the application program being executed on a data processing system; the data comprising:
data structure stored in said memory, which data structure includes a unified classification information generated from a multiple information resources;
said unified classification graph includes hierarchy of unified categories; leaf unified categories in said hierarchy being connected to information pages;
whereby, information pages accessible through the multiple information resources are also accessible through the hierarchy of said unified classification information graph.

The invention further provides for a system for dynamically obtaining a unified classification information graph which provides a navigation system for a user to access sought information, comprising:
input device receiving a multiple information resources that include a respective hierarchy of categories each of which associated with a category; leaf categories in said hierarchy being connected to information pages;
generator, generating a unified classification information graph utilizing at least the hierarchy of categories and the categories of said multiple information resources; said unified classification graph includes hierarchy of unified categories; leaf unified categories in said hierarchy being connected to information pages;
whereby, information pages accessible through the hierarchy of said multiple information resources are also accessible through the hierarchy of said unified classification information graph.

By another aspect the invention provides for use with a unified classification information graph generated by the above method, a method for retriving information of interest comprising:
(i) providing user query;) and (ii) identifying unified categories in said unified classification information graph which substantially match said query.

According to the latter embodiment there is further provided the step of:
identiying the at least one information page in said unified classification information graph that is connected to said unified categories.

Preferably, any information page that is connected to a leaf unified category in the unified classification information graph contains information that can be described by the unified category information of said unified leaf category. Unified category information stands for the unified category of the leaf category and the unified categories of all its ancestors in the hierarchy.

Still further preferably, all the information pages in the multiple information resources that contain information that can be described by the unified category information of said leaf unified category are connected to the latter.

BRIEF DESCRIPTION OF THE DRAWINGS

In order to understand the invention and to see how it may be carried out in practice, a preferred embodiment will now be described, by way of non-limiting example only, with reference to the accompanying draw, in which:

FIGS. 4a–b: are two schematic illustrations depicting an example of respective input and output learn phase.

DETAILED DESCRIPTION OF A PREFERRED EMBODIMENT

Introduction

The key elements of the method of the preferred embodiment will be presented in terms of an electric commerce application over an Internet client server environment in which the information integration capabilities of this invention are advantageous. Further environments and different configurations and the modifications they entail will be specified below.

The application of Internet Electronic Commerce is based on the use of electronic store-fronts and online catalogs. These catalogs are built specifically to enable customers to electronically browse in search for goods. From the customer's perspective, the business interaction process of identifying the right products and services, locating potential suppliers, and closing a deal that provides the best value for the money involves a great deal of repetitive browsing and tedious comparison work.

The preferred embodiment described, provides an information integration solution to buyers obtaining information from multiple product information resources using a single unified access interface.

Electronic Commerce Client Server System Over the Internet

Figure 1:
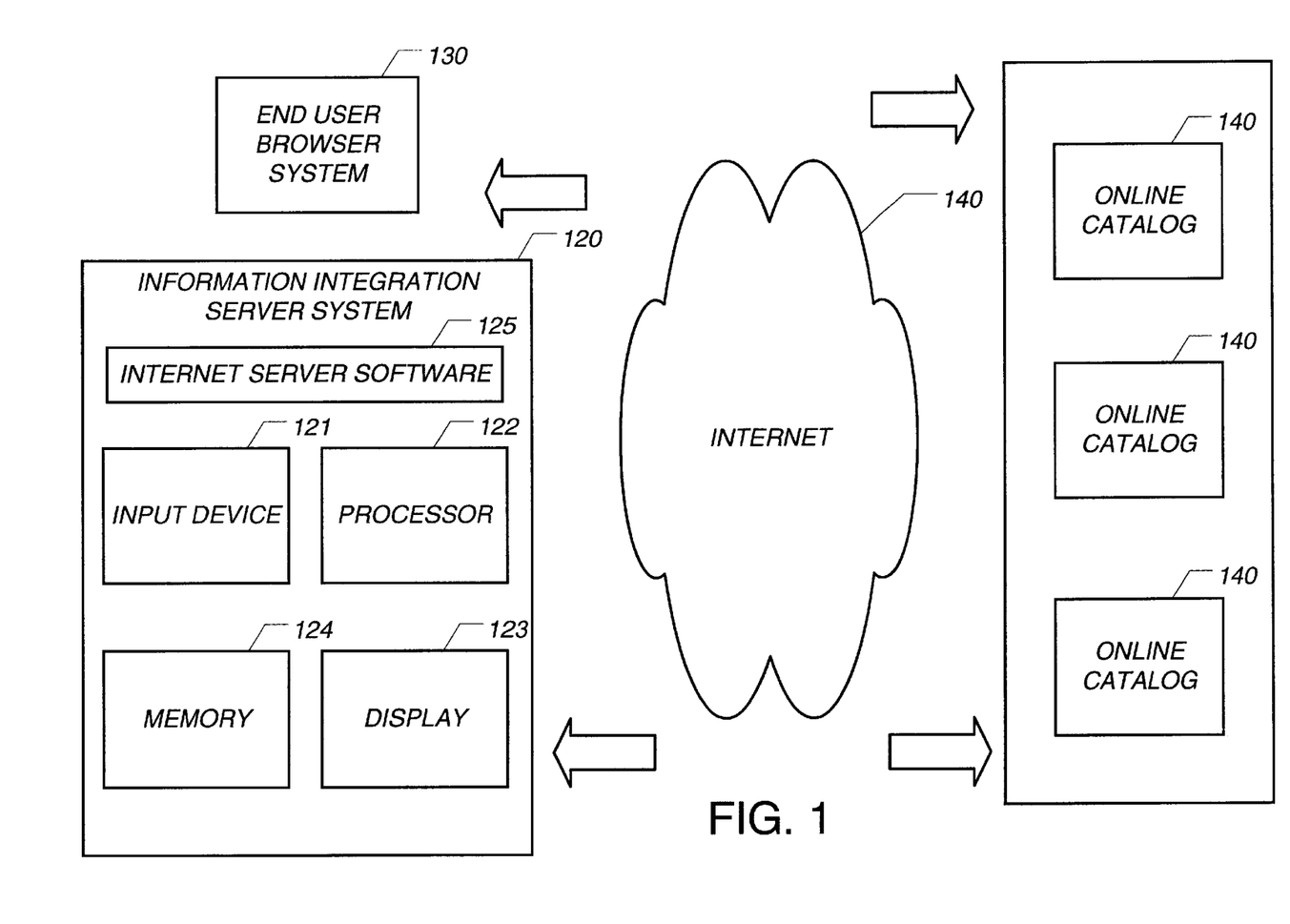
FIG. 1: is a block diagram illustrating an Internet electronic commerce client-server environment.

Referring to FIG. 1, an Internet client-server system upon which an embodiment of the present invention could be implemented is shown as 100. An Internet client-server system 100 comprising a set of online catalogs 110, an information integration server computer system 120 and end-user browsing system 130.

The end-user browsing system 130 might be a personal computer, a network computer, a television with Internet operating device, or any other system setup as long as it enables the user to interact with the Internet via a standard browser-like mechanism. As a matter of default, it enables communication with any Internet WWW site, the display of standard Internet pages (current standard is HTML) and the selection of new pages by means of hyperlink selection and full address (URL) specification.

A set of online catalogs 110 comprises (as an example) three online catalogs 111, 112, 113. An formation intergration server computer system 120 comprises an input device 121, processor 122, display 123 and memory 124 and standard Internet server software (which manages the communication of the information integration sever computer system 120 with the Intenet).

An Internet abstract cloud is shown as 140. This cloud symbolizes the global inter-system communication done via standard Internet protocols using standard Internet infrastructure. The communication and content delivery standards (http, HTML , . . . ) are not an essential part of the present invention.

The invention is preferably implemented as software, and is installed on the information integration server computer system 120.

0.1. AN example of Internet online catalog logical structure

Figure 2:
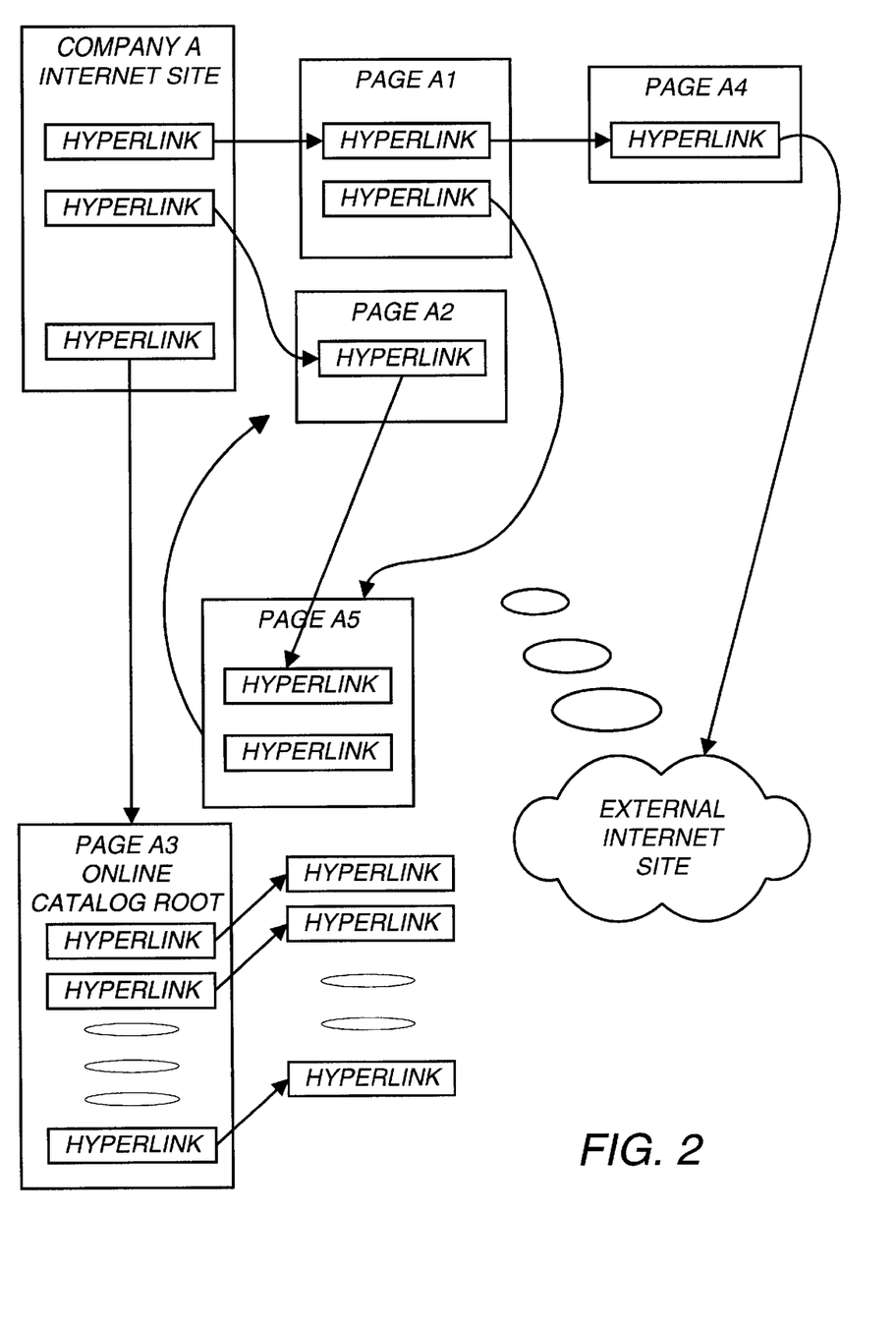
FIG. 2: illustrates a schematic structure of an online catalog within an Internet site.

Referring to FIG. 2, an Internet on-line catalog logical structure example is shown as 200. The Internet on-line catalog logical structure is a mesh of nodes and edges. Each node is an HTML page. Each edge is a HTML hyper-link to another HTML page. The HTML hyper-link is possibly, but not necessarily, of the basic form:

<A HREF="URL">Text</A>

Where "Text" is the text appearing on the user's browser as the hyper-link name and "URL" is the address of the page to be accessed when the user selects this hyper-link (using his input device). Also, the specific hyper-link syntax is not an essential part of the present invention. Rather, the method could be easily adapted to each new World Wide Web page and hyper link compatible model.

A basic assumption is that per each external request of HTML hyper-link, the Internet online catalog provides the relevant HTML page. By one embodiment of the invention, it can be readily seen that the logical mesh of pages and links actually induces a graph data structure. This induced graph is not created—rather, it can be thought of as a view into the online catalog structure. This induced graph will be referred to as the LinkGraph, and is defined below.

The invention provides a method to unit any number of LinkGraphs from multiple, often remote information resources. The resulting graph is termed a Unified Classification Information Graph (UCIG).

Integration of the LinkGraph and its unification into the Unified Classification Information Graph, together with a user's ability to use the U.C.I.R information without loss of information recall or precision constitutes one variant of the invention.

A Two-Phase Operation

The invention includes two main operational phases. The learn-phase and the user-query-phase. In the first phase, hereinafter the learn phase, according to the invention, each of the online catalogs in the online catalog set 110 is accessed and a special representation of its classification information is created. Then, all the online catalog representations are unified into the single unified-classification graph—the Unified Classification Information Graph. The unified classification also includes connections to the information pages themselves, located in the online catalogs. An essential part of the present invention is the automatic creation of the said Unified Classification Information Graph.

In the second phase(FIG. 3), hereinafter the user query phase, the user uses his end-user system 130 to issue a query to the information integration server software about a required product or service. Then, the information integration server software uses the stored unified-classification to identify several relevant categories. Preferably but not necessarily, the information integration server software may present the user with these categories. The user may select a subset of these categories as his final query. The information integration server software then accesses the relevant online catalogs and obtains the relevant product information pages. As an optional step, it may collate the information, and filter it according to filters prepared at the learn phase. Lastly, it sends it to the end-user system 130 to be presented to the user.

0.1.1. The Learn Phase

Figure 4B:
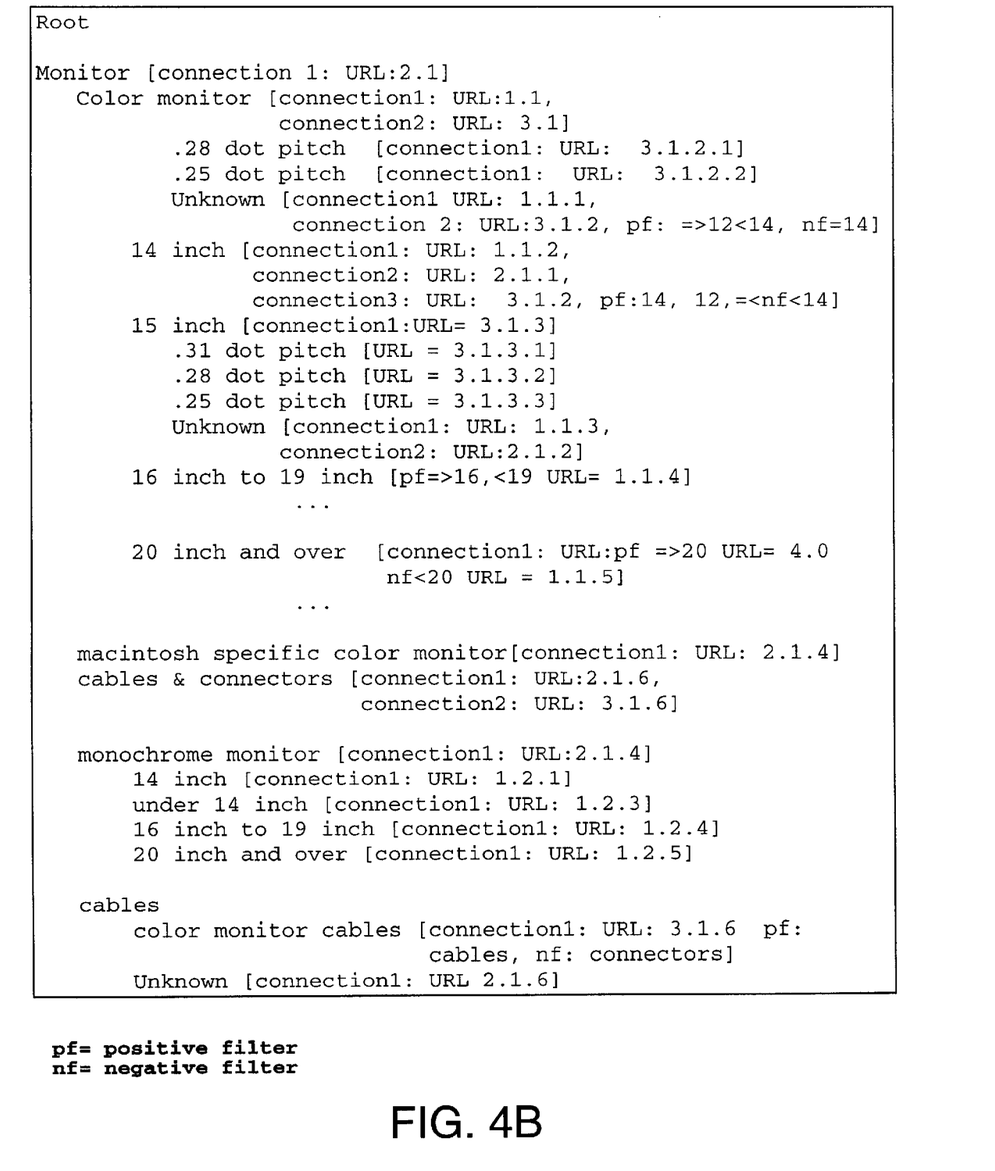

FIGS. 4a–b. depicts an example of input and output of the Learn Phase. FIG. 4a illustrates three Link Graphs as derived from input information resources and the resulting Unfied Classification Information Graph, which has been generated by the algorithm desribed below.

As stipulated above, the resulting Unified Classification Graph is connected to all information pages that are connected to the original Link Graphs.

Thus, the category (cables & connectors) of the input information resources is depicted in FIG. 4A, is present in FIG. 4b in the Unified ClassificationInformationGraph albeit in slightly different form. Thus, the categories of the input virtually reside also in the output.

Step 1: Initialization

In this step, a subset of the induced LinkGraph is created according to the following roles:

1. A Node (Text, URL) is created if it was induced by a hyperlink included in a categories page of an online catalog, and the URL points to either a categories page or a product information page within the online catalog (see Page Type Identification section below). The text is denoted by the LinkGraph category.

2. An edge is created if and only if both nodes of the edge are created.

3. If any of the created nodes doesn't have more than one outgoing edge (i.e., the node URL points only to a product page), then it constitutes a leaf node. Otherwise (i.e., the node URL points to a categories page), the node is a non-leaf node (denoted only as a parent node).

4. An additional node is created for the online catalog root page Node(online catalog name, online catalog root URL). An edge is added between the root and all the nodes representing HTML hyperlinks contained in the online catalog categories root URL.

The resulting created graph is named the LinkGraph and it represents one embodiment of classification of the online catalog. According to one embodiment of the invention, the system administrator uses a formal graph notation to manually describe the graph—based on the creation guidelines.

According to this approach, the notation is read and the corresponding graph data structure is created. This process is well known in the literature and needs no further explanation.

Step 2: Normalization

The next step in the Learn phase involves the creation of the Classification Graph which is a directed graph representing a normalized classification form in the sense that it obeys certain classification description rules. The LinkGraph is kept for use in later stages (the LinkGraph embodies the connection to each single online catalog relevant page).

Step 2.1: The ClassificationGraph construction 2.1.1. For every node in the LinkGraph, generate a node in the ClassificationGraph at contains the following information:

1. CIG Category—initialized by the same content as the generating LinkGraph node<Text>field, represented as a list of phrases as defined by CIG category below.
2. A list of LinkGraph node connections (defied below) initialized to a single connection to the original LinkGraph node generating this ClassificationGraph node. Where LinkGraph Node Connection comprises of:
   UCIG node
   LinkGraph Node
   Positive Filter: a set of tokens that are derived from the match between the UCIG node and its connected LinkGraph node.
   Negative Filter: a set of tokens that are derived from the mismatch between the UCIG node and its connected LinkGraph node.

Node Connection goal: A UCIG node should be connected to LinkGraph nodes that have access to product information matching the UCIG node category. If the LinkGraph node accesses product pages such that only part of them match the UCIG node category, then we use positive and negative filters, in order to filter products, and retrieve only the products relevant to the category. E.g., a UCIG node with a category "586 laptop" will be connected (using a LinkGraph node connection) to all LinkGraph nodes that contain products of this type.

2.1.2 An edge is drawn between two ClassificationGraph nodes if and only if an edge was drawn between their generating LinkGraph nodes.

Step 2.2: CIG categories transformations

The following is a typical yet not an exclusive embodiment of the normalization process which can differ from graph to graph.

In this step, tokens in various forms are taken and manipulated according to pre-set rules that can change from graph to graph. They are as follows:

1. Transform letters from upper case to lower case.
2. Transform all plural forms to singular from. E.g., tables is transformed to table.
3. Represent a category text as its individual phrases (as defined below). e.g "extension cord, power cables" is comprises of the phrases, "extension cord" "," "power cables". The phrase "extension cord" comprises of the tokens: "extension", "cord".

The phrase "power cables" comprises of the tokens: "power", "cables".

4. Transform phases designated as needing the separator "-" between them to the said phrases: e.g., on line becomes on-line.
5. Transform a sting of letters to its string of letter synonym as defined in the knowledge base. E.g., the string "phone" is transformed to "telephone".
6. Transform "-and" to "and".
7. Insert a space after the last digit in a sting comprising of numbers and text e.g., 100 Mhz becomes 100 Mhz.
8. Transform text of the form "X and Y accessories" to "X accessories and Y accessories"
9. Transform text of the form "X accessories" to "X and X accessories".
10. If the category contains a number (by digits or text, e.g., "two to four", "17 inch"), then handle Intervals as described below.

Intervals

Given: a sequence of tokens in the form of a single number or a range of numbers bounded by a minimum value and a maximum value, and optionally a measurement unit.

Goal: represent the given token sequence as an interval token, comprising of:

Minimum number (min)

Maximum number (max)

Measurement, if given (unit)

Interval construction: Given a text that contains a number, it is compared to predefined interval templates in order to construct its interval representation. Following are several examples of interval templates:

1. Two phrases comprising of numbers with an interval-separator token (such as: "-", "to", or ".", ...) between them signifying a set of numbers such that the token before the interval separator is the lowest limit of the boundary and the token after the separator is the highest limit.
2. Any string which has one number token with a space before and after with or without a set of tokens signifying measurements such as Mhz, GB, ", cm, lb., (hereafter a "unit") and/or a set of tokens such as "and above", or "and over".

EXAMPLES (1)
Text: "17 to 19 inch"
Interval-template: min interval-separator max unit
Interval representation: min=17, max=19, unit=inch
(2)
Text: "17 and up"
Interval-template: {min and up}
Interval representation: min=17, max=MaxInt, unit)""

Those versed in the art will readily appreciate that some normalization steps may be deleted, or modified, and others can be added, all as required and appropriate, depending upon the particular application.

Definitions (that apply to the present examples):

Token: A string the category text that is bounded by a space character or the category beginning or ending. E.g., the tokens of the category "computer 486/586" are: {computer, 486,/, 586}.

Text-Separator: A token of the type (but not limited to): "and", "or", "&", "/",",",",-"

Phrase: Any combination of one or more continuous tokens separated by a text-separator, or the category b or ending. E.g., category "laser printer & plotter", phrases: "laser printer", "&", "plotter".

CIG Category: The series of phrases that is the output of processing a LinkGraph category. E.g., if the original LinkGraph category is "scanners & digital cameras", then the output UCIG category comprises of the following phrases: "scanners","&", "digital cameras".

Throughout this document the term "category" refers to a Unified Classification Information GraphCategory
Special tokens (given in the knowledge base)
Neutral Tokens: tokens which do not add information to the category. E.g., system, product, miscellaneous.
Phrase Head Token: The token which is the head of the noun phrase. E.g., the head of "Cable of printer" is cable, the head of "monitor connector" is connector.
Category head tokens: From each phrase in the category we take its noun phrase head. This constitutes the category head tokens. E.g, the category head tokens of "cables for printer and monitor connectors" are: cables, connectors.

Step 3: Integration

For each new online catalog learned the output of the previous steps a ClassificationGraph is created, a directed acyclic graph which represents a normalized classification of the classification found in the online catalog. Also, the ClassificationGraph nodes contain pointers to nodes of the LinkGraph.

If this is the very first online catalog that is being learned, then the ClassificationGraph becomes the UnifiedClassificationInformationGraph which represents the accumulative classification knowledge that has been learned.

If this is not the first online catalog, then the nex step in the Learn Phase is to unify the newly generated ClassificationGraph, denoted by NewGraph with the existing UnifiedClassificationlnformationGraph.

A. Integrate NewGraph into UCIG
1. Initialize NonHandledNodesQueue to a queue of all nodes in the NewGraph, entered by their order in BFS (breadth first search) traversal on the NewGraph. Hence, a parent node will always be ahead of its descendants in this queue.
2. Initialize HandledNodesQueue to an empty queue of nodes.
3. While the NonHandledNodesQueue is not empty
   3.1 NewNode=Top of NonHandledNodesQueue
   3.2 Integrate NewNode into UnifiedClassificationGraph (defined below)
   3.3 Remove NewNode from NonHandledNodesQueue, and add it into the HandledNodesQueue
4. Now HandledNodesQueue contains all nodes from UCIG, but in an opposite order than the initialized NonHandledNodesQueue, such that a child node is always ahead of its parent Clean from UCIG nodes from NewGraph that had children nodes in the NewGraph, such that all these children nodes were already integrated (by unify or by "add edge" as defined below) into UCIG.

B. Integrate NewNode into UCIG
Assumption: all ancestors of NewNode were already integrated (by A.1)
1. Get candidates for node NewNode:
   1.1 Prepare RelevantTokens, the set of tokens that will generate candidates:
      1.1 1. Denote RelevantTokens as all tokens from NewNode
      1.1.2 Remove from Relevant Tokens irrelevant tokens. Eg., remove Neutral Tokens, and remove tokens which already appear in one of the ancestors of NewNode.
   1.2 Prepare RelevantCandidates, the set of nodes from UCIG that are candidates for integration with NewNode:
      If NewNode is the NewGraph root node,
      then the RelevantCandidates are the root node of UCIG.
      Else
      Initialize RelevantCandidates to an empty set
      For each token in RelevantTokens, add all nodes in UCIG containing this token into the RelevantCandidates (if not already there)
      For every node in RelevantCandidates, if it does not contain one of the category head tokens remove it from RelevantCandidates
2. Initializations:
   Initialize NewNodeTotalNonMatchedPhrases to the set of all phrases in the NewNode. in the next section (section 3) the set is updated such that only phrases that were not integrated in any way to the existing nodes in the UCIG, will remain
   Initialize CandidatesContainingNewNode to an empty set of nodes
   Initialize CandidatesContainedInNewNode to an empty set of nodes
3. Handle candidates:
   For each candidate in RelevantCandidates:
   3.1 Check match level from NewNode to Candidate (see section C), and initialize:
   NewNodeToCandidateMatchLevel,
   NewNodeMatchedPhrases (phrases in NewNode that match the candidate)
   NewNodeNonMatchedPhrases (phrases in NewNode that do not match the candidate)
   3.2 Check Match Level from Candidate to NewNode (see section C), and initialize:
   CandidateToNewNodeMatchLevel,
   CandidateMatchedPhrases,
   CandidateNonMatchedPhrases
   3.4 Decide what to do according to the found match levels:
   3.4.1. If (NewNodeToCandiadateMatchLevel= FullMatch) AND (CandidateToNewNodeMatchLevel= FullMatch or PartialMatch) [I.e., NewNode is contained in the candidate, and the candidate is fully or partially contained in the NewNode. E.g., NewNode=cables, Candidate= cables and connectors]
   Then
   Unify NewNode into Candidate with empty filters (defined below)
   Remove from NewNodeTotalNonMatchedPhrases all phrases that are in NewNodeMatchedPhrases.
   3.4.2. If (NewNodeToCandidateMatchLevel= PartialMatch) AND (CandidateToNewNodeMatchLevel=FullMatch or PartialMatch) [I.e., NewNode is partially contained in candidate, and the candidate is fully or partially contained in NewNode. E.g., NewNode=cables and connectors, Candidate=cables]
   Then
   Unify NewNode into Candidate with filters: NewNodeMatchedPhrases, NewNodeNonMatchedPhrases [i.e., Unify NewNode into the candidate: some of the new node phrases were found in the candidate, and some were not. Put the found phrases as positive filter, and the unfound phrases as negative filters. In the online search, the products connected to this category will be filtered according to the positive and negative filters, such that only products that match the filters will be shown in the search results.]
   Remove from NewNodeTotalNonMatchedPhrases all phrases that are in NewNodeMatchedPhrases.
   3.4.3 If (NewNodeToCandidateMatchLevel=NoMatch) AND (CandidateToNewMatchLevel=FullMatch or PartialMatch) [ie., If the candidate is contained NewNode and the NewNode is not contained in the candidate. E.g., NewNode=laser printer, Candidate=printer]

Then

Add candidate to CandidatesContainedInNewNode 3.4.4 If (NewNodeToCandidateMatchLevel=FullMatch or PartialMatch) AND (CandidateToNewNodeMatchLevel=NoMatch) [i.e., If the candidate is containing NewNode, and is not contained in NewNode. E.g., NewNode=printer, Candidate=laser printer]

Then

Add candidate to CandidatesContainingNewNode

4. If NewNodeTotalNonMatchedPhrases is not empty [i.e., not all phrases in the new node were unified into candidates]

4.1 Add edges from relevant candidates to NewNode: For each Candidate in CandidatesContainedInNew Copy NewNode to NewNodeCopy Add edge from Candidate to NewNodeCopy(defined below)

Initialize NewNodeCopy category to {NewNode category phrases\NewNodeNonMatchedPhrases}

If NewNode is a leaf node

Initialize NewNodeCopy positive filter by NewNodeMatchedPhrases, and the negative filter by NewNodeNonMatchedPhrases.

Initialize NewNodeCopy parents to NewNode parents

Remove from NewNodeTotalNonMatchedPhrases all phrases that are in NewNodeMatchedPhrases.

If NewNodeNonMatchedPhrases is empty

Delete NewNode

[e.g., NewNode=laser printer & ink plotters, candidate=printer, so add edge from the candidate 'printer' to the new node copy 'laser printer', and leave the original "laser printer & ink plotters" as it is. It will be handled at step 5)]

4.2 Add edges from the NewNode to relevant candidates

For each Candidate in CandidatesContainingNewNode

Add edge from NewNode to Candidate (defined below)

[e.g., NewNode=laser printer & plotter, candidate= color laser printer, so add edge from the new node 'laser printer & plotter' to the candidate 'color laser printer']

Remove from NewNodeTotalNonMatchedPhrases all phrases that are in NewNodeMatchedPhrases.

5. If NewNodeTotalNonMatchedPhrases is not empty [I.e., there are phrases in NewNode that were not unified or added edge from or to any candidate]Then update NewNode as follows:

5.1 Initialize its category to the concatenation of phrases in NewNodeTotalNonMatchedPhrases 5.2. If NewNode is a leaf:

Then

Initialize NewNode positive filters by NewNodeTotalNonMatchedPhrases,

Initialize NewNode negative filters by {The original set of NewNode phrases\NewNodeTotalNonMatchedPhrases}

Else (it is a parent)

Remove from NewNode children nodes which have an additional parent (since it means that the additional parent is a candidate that the NewNode was unified into, hence added its child nodes to it)

5.3. The NewNode parents are not changed

Example: Given: NewNode='fax and modem', Candidate='modem', and no candidate in the UCIG contains the token 'fax'. Then NewNode 'fax and modem' is unified into the Candidate node 'modem' with positive filters 'modem' and negative filters 'fax'.

NewNode name is modified to 'fax', and the following filters are added to its LinkGraph node: positive filters: fax, negative filters 'modem'

C. Check match level from node N1 to node N2

Ni-Phrases is the set of phases of node Ni and its ancestors.

Throughout the following definitions, we ignore tokens that appear in phrases of Ni-Phrases, if the knowledge base indicates that they should be ignored. For example, we ignore the following tokens:

Neutral tokens, that do not add information to the node. E.g., "product", "miscellaneous".

Tokens of ancestor nodes that represent a department of product types, such as "hardware", "office equipment", "kitchen accessories".

Tokens of ancestor nodes of N1 that are on the same semantic family (according to the knowledge base) as tokens in N2-phrases. E.g., If N1=storage–disk, and N2=disk, Then "storage" is ignored, if in the knowledge base appears as a token that is in the same semantic family of "disk".

A token match level to node Ni is:

FullMatch if the token is included in Ni-Phrases

NoMatch if the token is not included in Ni-Phrases

An interval token, IT, match level to node Ni is;

FullMatch if Ni-Phrases contain a phrase that contains an interval token, ITi, such that IT interval boundaries are contained in Iti interval boundaries. Ie., ITi-min<=IT-min<=IT-max<=ITi-max PartialMatch if no FullMatch, and Ni-Phrases contain a phrase that contains an interval token, Iti, such that ITi has an overlap with IT. I.e, ITi-min<=IT-min<ITi-max<=IT-max, or IT-min<=ITi-min<=IT-max <=ITi-max NoMatch if Ni-Phrases does not contain any phrase that contains an interval token, or that every interval token that is included in Ni-Phrases does not overlap with the given IT interval I.e., for every interval token Iti in Ni-Phrases: ITi-min<=ITi-max<=IT-min<=IT-max, or IT-min<=IT-max<=ITi-min<=ITi-max In addition, we demand that the unit measurements of compared intervals will not contradict A phrase match level to node Ni is:

FullMatch if the match level of every token in the phrase to Ni-Phrases is Fullmatch.

PartialMatch if not FullMatch, and every regular token has FullMatch to Ni-Phrases, and every interval token has Fullmatch or Partialmatch to Ni-Phrases.

NoMatch if there exists a token with NoMatch match level to Ni-Phrases

E.g., The phrase "color printer" has Fullmatch to Ni-phrases={printer, color laserjet}.

The phrase "14 to 16 inch" has PartialMatch to Ni-phrases={monitor, 12–15}, and Fullmatch to Ni-Phrases={color monitor, 12 and up} (since the interval"12 and up" is represented by min=12, max=MaxInt)

A category match level to node Ni is:

FullMatch if every phrase in the category has FullMatch to Ni

PartialMatch if there exists a phrase in the category that has PartialMatch or FullMatch to Ni and there exists a phrase in the category that has NoMatch to Ni.

NoMatch if no phrase in the category is included in Ni

E.g., category="color printer and plotter"
Ni-phrases={printer, color lasetet},
Match level is PartialMatch, since one of the category phrases, "color printer" is included in the Ni-phrases, "plotter" is not included in the Ni-Phrases.

Check Match from N1 to N2

The Match Level from node N1 to node N2 is:

FullMatch if N1 category match level to N2 is FullMatch, and every ancestor category of N1 match level to N2 is FullMatch or PartialMatch.

PartialMatch If N1 category match level to N2 is PartialMatch, and every ancestor category of N1 match level to N2 is FullMatch or PartialMatch.

NoMatch If there exists a category from N1 or its ancestors such that its match level to N2 is NoMatch.

N1-MatchedPhrases are phrases from N1 category that are included in N2.

N1-NonMatchedPhrases are phrases from N1 category that are not included in N2.

Example:
N1=printer & plotters→color→laserjet
N2=printer→color→laserjet & inkjet
N3=laserjet printer→8 pin→color
N3-phrases={laserjet printer, 8 pin, color}
Match Level from N1 to N3 is FullMatch, since The match level of "laserjet" to N2 is FullMatch The match level of the category "color" to N2 is FullMatch The match level of the category "printer & plotter" to N2 is PartialMatch N1 category has FullMatch to N3, and its ancestor categories have FullMatch or PartialMatch to N3.
N1-MatchedPhrases={laserjet}
N1-NonMatchedPhrases={}
Match Level from N2 to N3 is PartialMatch, since The match level of "laserjet & inkjet" to N2 is PartialMatch.

The match level of the category "color" to N2 is FullMatch

The match level of the category "printer " to N2 is FullMatch

N2 category has PartialMatch to N3, and its ancestor categories have
FullMatch or PartialMatch to N3.
N2-MatchedPhrases={lasetet}
N2-NonMatchedPhrases={inkjet}
Note:

The root is fully included in every node (since it has no tokens)

Match level is Assymetric, it is possible that N1 match level to N2 is full, and N2 to N1 match level is none E.g., N1=printer, N2=color printer.

Unify a CIG NewNode into a UCIG candidate ps Given:
  NewNode
  Candidate
  MatchedPhrases
  NonMatchedPhrases Process:
  1. If NewNode is a leaf and Candidate is a parent
    Add NewNode LinkGraph connections to Candidate Unknown child (defined below) connections (if the candidate does not have an unknown child, create it)
  If NewNode is a leaf and Candidate is a leaf
    Add the LinkGraph connections of NewNode to Candidate node connections
  If NewNode is a parent and Candidate is a parent
    Add NewNode children that match the MatchedPhrases and do not match the NonMatchedPhrases to the Candidate children
  If NewNode is a parent and Candidate is a leaf
    Add NewNode children that match the MatchedPhrases and do not match the NonMatchedPhrases as children of Candidate
    Create unknown child to Candidate
    Move the Candidate LinkGraph connections to its unknown child (defined below)connections
Unknown Child The unknown child holds connections to LinkGraph nodes, that are not known to be related to any of the sibling nodes of the unknown child.

There is at most one unknown child to any parent node. And this unknown child is invisible to the user. See user query section to see how unknown children are handled given the user query.

Example: Suppose "printer" was mentioned on catalog c1 on a link pointing to a categories page with the categories "LaserJet printer", "InkJet printer". On catalog c2 "printer" was pointing to a product page. Then when the user asks for printer, he will be presented with "printer", with children: "laserjet printer", "injet printer", connected to c1 LinkGraph connections. The connection to catalog c2 product page of printers, could not be hanged on one of these children, since it holds unclassified printers that are not known to belong to laserjet or inkjet or other printer. So, we add an unknown child (invisible to the use), and connect it to c2 printer product page.

Add Edge from node N1 to node N2
If N1 is a parent node
Then
  Add an edge from N1 to N2
Else, if it is a leaf node
Then
  Add an edge from N1 to N2
  Add an unknown child to N1
  Move N1 LinkGraph connections to its unknown child LinkGraph Connections Step 4: Periodic Update of Integration
Given:
  UCIG
  An old LinkGraph connected to UCIG
  A new LinkGraph constructed from the same resource
  Where part of the new LinkGraph is identical to the old LinkGraph, part of it is newly added and part of the old LinkGraph does not exist any more in the new LinkGraph.
Goal:
  Reintegrate the LinkGraph into UCIG to reflect the changes that were made to the online catalog.
Process:
  1. Update Matched Graph under new LinkGraph root, old LinkGraph root (as defined below). This is a recursive function, that for each node in the new LinkGraph that is found in the old LinkGraph which is connected to the unified graph—update the urls in the unified graph, and delete it from the new graph 2. Integrate new LinkGraph into UCIG as defined in the learn phase. This will integrate only the new nodes that appear in the new LinkGraph, and not in the old LinkGraph. Since the nodes which did not change between the Link-Graphs were deleted at the previous step 1.

3. Remove from UCIG all connections to old LinkGraph nodes.

4. Clean from UCIG leaf nodes that are not connected to any LinkGraph nodes. Those nodes were connected to the old LinkGraph nodes that do not exist any more in the new LinkGraph nodes.

Update Matched Graph (NewNode, OldNode)

NewNode is a node in the new LinkGraph

Figure 3:
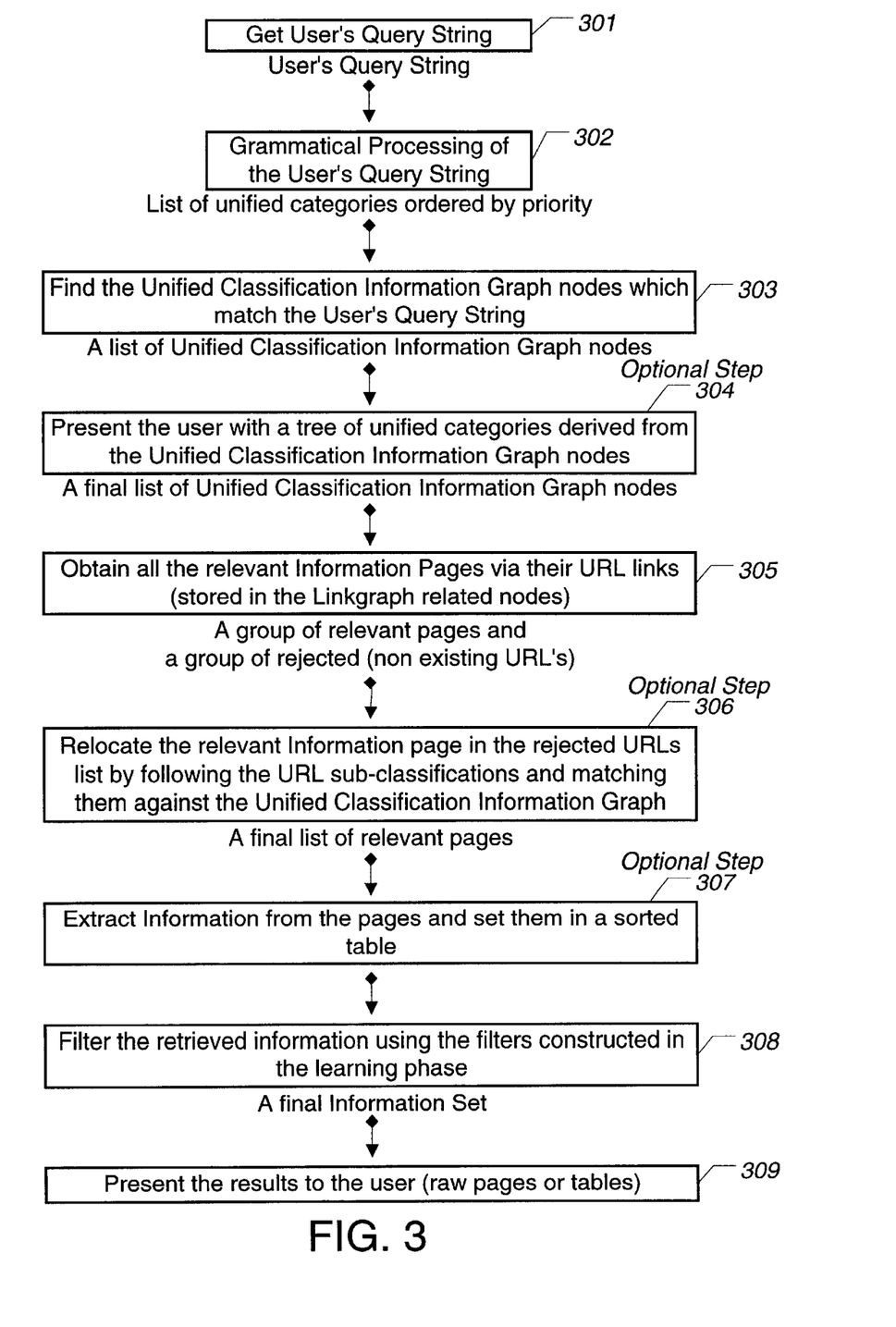
FIG. 3: is a flowchart illustrating a user-query phase steps, according to one embodiment of the invention.

OldNode is a node in the old LinkGraph returns true if and only if new node and its descendents are already connected to UCIG 1. Find UCIG nodes that are connected to OldNode
2. If found such UCIG nodes p0    Then
    Update in their LinkGraph connection the URL of NewNode instead of the URL of OldNode.
3. If NewNode is a leaf
    Then if found connection
        Return true
    Else
        Return false At the following step (4), for a parent NewNode, recursively check; if all his children are in the unified graph, then return true—NewNode will be deleted by its calling function 4. If NewNode is a part (non-leaf)
    For each NewChild of NewNode
    For each OldChild of OldNode
        If (check match level from NewChild to OldChild is FullMatch) AND (check match level from OldChild to NewChild is FullMatch))
            If (Update Matched Graph (NewChild, OldChild))
                Delete NewChild
    If all NewChild were deleted
        Return true
    Else
        Return false Step 5: The Query Phase Referring to FIG. 3, these are the Query Phase steps:

Step 301: The user uses his end-user system to issue a query to the information integration server software about a required product or service. The query is a free text description of the target product type.

Step 302: The normalization process of the learn phase is subjected to the user's string as if it where a node's category. The result is a CIG node representation of the user query, denoted by QueryNode.

Step 303: Apply Get candidates for QueryNode as described in Step B, section 1.
    Filter candidates that do not contain the QueryNode head tokens.
    For each candidate in the list:
        1. If (match level from candidate to QueryNode is FullMatch or PartialMatch) AND (match level from QueryNode to candidate is FullMatch or PartialMatch)
            Then
                Add the candidate to FullMatchedCandidates.
        2. If (match level from candidate to QueryNode is FullMatch or Partial Match) AND (match level from NewNode to candidate is NoMatch)
            Then
                Add the candidate to QueryContaining Candidates.
        3. If (match level from QueryNode to candidate is NoMatch) AND (match level from candidate to QueryNode is FullMatch or PartialMatch)
            Then
                Add the candidate to QuaryIsContainedInCandidates.
    We are left with 3 groups:
        FullMatchedCandidates,
        QueryContainingCandidates, and
        QueryIsContainedInCandidates.
    If FullMatchedCandidates is not empty
        Show the user the FullMatchedCandidates, and skip to step 304
    If QueryContainingCandidates is not empty
        Show the user the QueryContainingCandidates, and skip to step 304
    Otherwise
        Show the user the QueryIsContainedInCandidates.

Step 304: This step enables the user to refine the node selected by step 303. All nodes from UCIG that are in MatchedCandidates, accepted by step 303, are presented. The user may select any node, or may further expand it to select one of its child nodes. Nodes of type "unknown nodes" are not shown to the user. Those are internal nodes, used in step 305. The process ends when the user finishes selecting nodes.

Step 305: For each node in the final list, and for each LinkGraph node of respective node, and from each leaf node accessible from of respective LinkGraph, a product page URL contained in said leaf, is obtained. If the user selected a node which has a sibling node of type "unknown node", then this "unknown node" is automatically selected, and for its connections dynamic positive filters containing all phrases from selected nodes are generated.

Step 306: If the URL looked for in step 305 above) does not exist, An evaluation step commences at the route of links leading from the catalog beginning to the desired product page: (L1, L2, . . . , Ln), such that L1 leads to the first categories page of the catalog, and Ln is the selected category link leading to a product page. If Ln points to a page that is no longer valid, go back to Li, such that Li is the first link from the end with a valid URL. Advance incrementally from Li to Ln, by bringing the page pointed by Li, and looking for Li+1 link in the page, until the new URL address for Ln is found. The route from L1 to Ln was prepared off-line in the LinkGraph generation, thus it is possible that in an online access one may find that this route does not appear as is in the catalog, because of changes in the categories structure or text. The following changes may be handled:

If a link name is not found in a page it is expected to be found, an equivalent link name is sought, where equivalency is set by applying the rules as in the learn phase.

If Ln used to be a leaf category, pointing to a product page, and in online access it is found that it points to another categories page, then all the product pages under the Ln., are taken recursively.

If any Lj is not found (product type is not sold any more, links were added after a link that used to be a leaf, other types of pages were added) then his catalog online is not handled online, but rather on off-line update process is notified as to which information should be reprocessed.

Step 307: For each product page obtained, the products information in the page is extracted. Then, for each user-request phrase, it aggregates all the products from into an ordered table.

Step 308: Send the results (raw pages or tables) to the end-user system.

Page Type Identification

Each catalog contains a number of page types. E.g.,

Categories page: a page used for browsing the catalog, containing list of product categories/types/properties. The catalog may contain many categories pages, all in the same structure. The categories page may contain more information in addition to the categories list. E.g., links to other places in the site or outside of the catalog.

Products page: a page with a list of products. Each product has its own description (e.g., product name, part number, manufacturer, price, . . . ). The product page may contain additional information out of the list of products.

Other pages, (e.g., search form of the catalog) are ignored at the learn phase.

Categories page and product page are constructed of the same building blocks and expressions. Thus, it is assumed that the following is given:

Categories page regular expression—a regular expression representing the categories page structure such that a page matches the regular expression if and only if it is a categories page.

Products page regular expression: a regular expression representing any product page such that a page matches the regular expression if and only if it is a product page.

For each page, it is matched to the categories page regular expression. If there is a match, the page type is 'Categories page'. Else, the, page is matched to the products page regular expression. If there is a match, the page type is 'Product page'. Else its type is 'Other'.

Further Environments and Different Configurations:

The preferred embodiment has been described in terms of an Electronic Commerce application over the Internet infrastructure. However, the main novelty (but not the only one) resides in constructing a unified category classification out of heterogeneous classification.

The underlying concept of the invention can be adapted to other global network environments. Thus, for example, by another embodiment the basic inter-communication model of hyperlinks is maintained and the online catalog is constructed as graph of classification links (among other links) and information pages. By this example, such a change affects only the LinkGraph formalities since the basic equivalence between the online catalog and the LinkGraph is kept.

Non client server (only one computer)—The same applies to the Client-Server environment The underlying concept of the invention could likewise be easily adapted to be applied with a single computer which performs the learn-phase on the online catalogs, stores the LinkGraph and ClassificationGraph locally. Then, the user accesses the user-query phase via the very same computer.

Those versed in the art, will readily appreciate the various described learn-phase and query-phase operations are only some out of many possible variants to obtain Unified Classification Graph in the manner specified. Accordingly, rules and parameters that appear in the specified steps may be modified, added or deleted all as required and appropriate depending upon the particular application. The same applies to the steps which pertain to the user query phase.

All English words mentioned in this document are not part of the algorithm. Rather, they are given as examples to the understanding of the method. Analogous words in a different language could be used. Thus, the method is not restricted to English.

The present invention has been described with certain degree of particularity, but those versed in the art will readily appreciate the various alterations and modifications may be carried out without departing from the spirit of the invention as defined in the following claims:

What is claimed is:

1. A method for dynamically obtaining a unified classification information graph which provides a navigation system for a user to access sought information, comprising the steps of:

(a) providing multiple information resources having different conceptualization systems that each includes a respective hierarchy of categories, leaf categories in said hierarchy being connected to information pages; and (b) generating a unified classification information graph by carrying out knowledge acquisition tasks utilizing at least the hierarchy of categories and the categories of said multiple information resources,said unified classificaiton graph including a hierarchy of unified categories, laef unified categories in said hierarchy of unified categories being connected to information pages;

such that information pages accessible through the hierarchy of said multiple information resources are also accessible through the hierarchy of said unified classification information graph.

2. The method of claim 1, wherein said step (a) includes providing at least some of multiple information resources that are located in sites of the Internet.

3. The method of claim 1, wherein said step (a) includes providing at least some of said multiple information resources that are located in databases.

4. The method of claim 1, wherein said step (a) includes providing at least some of said multiple information resources that are located in on-line catalogs.

5. The method of claim 1, further comprising associating categories in said hierarchy of categories in said multiple information resources with hyperlinks.

6. The method of claim 1, further comprising associating categories in said hierarchy of categories in said multiple information resources with menus.

7. The method of claim 1, wherein said step (b) includes:

(i) initialization so as to generate respective link graph that correspond to each information resource; said link graph includes link graph categories;

(ii) normalizing the link graph categories so as to generate a classification graph that includes classification graph categories; and (iii) unifying said classification graph so as to generate said unified classification information graph.

8. The method according to claim 7, further comprising providing a URL pointer of an on-line catalog for generating said link graph.

9. A machine having a memory containing data representing a unified classification information graph that was generated by the method of claim 1.

10. For use with a unified classification information graph generated by the method of claim 1, a method for retrieving information of interest comprising:
  providing a user query; and
  identifying unified categories in said unified classification information graph which substantially match said query.

11. The method of claim 10, further comprising the step of identifying the at least one information page in said unified classification information graph that is connected to said unified categories.

12. A memory for storing data for access by an application program, which application program is accessed by a user through a user interface for the user to access sought information, the application program being executed on a data processing system, the data comprising:
  a data structure stored in said memory, which data structure includes a unified classification information generated by carrying out knowledge acquisition tasks from multiple information resources having different conceptualization systems;
  said unified classification graph including a hierarchy of unified categories, leaf unified categories in said hierarchy being connected to information pages;
  such that information pages accessible through the multiple information resources are also accessible through the hierarchy of said unified classification information graph.

13. A system for dynamically obtaining a unified classification information graph that provides a navigation system for a user to access sought information, the system comprising:
  an input device receiving multiple information resources that have different conceptualization systems and that each includes a respective hierarchy of categories, leaf categories in said hierarchy being connected to information pages; and
  a generator to generate a unified classification information graph by carrying out knowledge acquisition tasks utilizing at least the hierarchy of categories and the categories of said multiple information resources, said unified classification graph including a hierarchy of unified categories, leaf unified categories in said hierarchy of unified categories being connected to information pages,
  such that information pages accessible through the hierarchy of said multiple information resources are also accessible through the hierarchy of said unified classification information graph.

14. The system of claim 13, wherein at least some of said multiple information resources are located in sites of the Internet.

15. The system of claim 13, wherein at least some of said multiple information resources are located in databases.

16. The system of claim 13, wherein at least some of said multiple information resources are located in on-line catalogs.

17. The system of claim 13, wherein categories in said hierarchy of categories in said multiple information resources are associated with hyperlinks.

18. The system of claim 13, wherein categories in said hierarchy of categories in said multiple information resources are associated with menus.

19. The system of claim 13, wherein said generator includes:
  an initialization unit for generating a respective link graph that correspond to each information resource, said link graph including link graph categories;
  a normalization unit for normalizing the link graph categories to generate classification graph that includes classification graph categories; and
  a unifying unit for unifying said classification graph to generate said unified classification information graph.

20. The system according to claim 19, wherein generating one of said link graphs includes providing a URL pointer of an on-line catalog.

21. For use with a unified classification information graph generated by the system of claim 13,
  a system for retrieving information of interest comprising:
  an interface for receiving a user query; and
  an identifier identifying unified categories in said unified classification information graph which substantially match said query.

22. The system of claim 21, further comprising
  an identifier identifying the at least one information page in said unified classification information graph that is connected to said unified categories.

* * * * *